United States Patent [19]

Glass

[11] Patent Number: 5,439,081
[45] Date of Patent: Aug. 8, 1995

[54] COMPRESSED COOLANT HYDRAULIC BRAKE ROTOR

[76] Inventor: Thomas V. Glass, 200 Glynn Dr., Birmingham, Ala. 35215

[21] Appl. No.: 299,825

[22] Filed: Aug. 31, 1994

[51] Int. Cl.$^6$ ............................................. F16D 65/78
[52] U.S. Cl. ....................... 188/264 CC; 188/218 XL
[58] Field of Search ...... 188/218 XL, 264 R, 264 AA, 188/264 D, 264 F, 264 CC

[56] References Cited

U.S. PATENT DOCUMENTS

| | | | |
|---|---|---|---|
| 2,911,075 | 11/1959 | Damiron | 188/264 D |
| 3,603,435 | 9/1971 | Buzzard et al. | 188/218 XL |
| 3,651,895 | 3/1972 | Whitfield | 188/264 CC X |
| 4,013,148 | 3/1977 | Kobelt | 188/264 D |
| 4,014,410 | 3/1977 | Bryant | 188/71.6 |
| 4,736,821 | 4/1988 | Ries | 188/71.6 |
| 4,863,000 | 9/1989 | Patel | 188/170 |
| 5,005,676 | 4/1991 | Gassiat | 188/218 XL |
| 5,018,407 | 5/1991 | Hoecht | 74/606 R |
| 5,358,077 | 10/1994 | DeConti | 188/264 D X |

FOREIGN PATENT DOCUMENTS

| | | | |
|---|---|---|---|
| 0604240 | 8/1960 | Canada | 188/264 F |
| 0157841 | 9/1982 | Japan | 188/264 CC |

Primary Examiner—Robert J. Oberleitner
Assistant Examiner—Peter M. Poon
Attorney, Agent, or Firm—Veal & Marsh

[57] ABSTRACT

A compressed coolant hydraulic brake rotor is provided for reducing heat energy build-up, thereby minimizing warping and deterioration of the rotor and brake pads. The rotor provides an enclosed volume and a valve assembly used for insertion of a fluid coolant medium, such as freon, within the enclosed volume, which houses a plurality of interior surface support fins. The rotor is "enclosed" in order to contain and govern the fluid coolant medium. As the rotor is engaged and begins to rotate, centrifugal force pressurizes the coolant medium within the enclosed volume and causes the fluid coolant medium to compress. The compressed coolant medium functions as a heat sink to draw heat energy away from the rotor, therefore to cool the rotor by heat energy transfer therefrom. The rotor may be used in any type of vehicle that functions with brakes. Advantages of the present invention include: a reduction of excessive heat build-up on the rotor, thereby extending brake pad and rotor life; and compatibility with all disk brake systems.

13 Claims, 8 Drawing Sheets

COMPRESSED COOLANT HYDRAULIC BRAKE ROTOR

CROSS-REFERENCE TO RELATED APPLICATION

This utility patent application relates to my co-pending design patent application Ser. No. 29/012,570, filed Sep. 9, 1993, which has received a Notice of Allowance dated Aug. 10, 1994, now U.S. Pat. No. D353,600 and which is hereby incorporated herein by reference in its entirety.

BACKGROUND OF THE INVENTION

1. Field of the Invention

The present invention relates generally to rotors for automotive hydraulic brake systems and, more particularly, to an improved rotor for an automotive hydraulic brake system, wherein the improved rotor houses a compressed coolant that reduces heat build-up and minimizes warping and deterioration of the rotor and associated brake pads.

2. Description of the Related Art

As is well-known in the art, hydraulic brakes for automobiles and other vehicles typically operate calipers which press at least one associated brake pad against at least one exposed plate of a rotor mounted to rotate with a rotating axle of the automobile. The rotation of a rotating rotor may be slowed by translating some of the kinetic energy of the rotating rotor to heat energy. Typically, this energy translation is accomplished by pressing the brake pad against the rotating rotor, thereby causing friction wherein the kinetic energy of the rotating rotor is translated to heat energy, thereby slowing the rotation of the rotor and therefore, the axle. Much of the generated heat energy is conducted directly to the rotor, which is typically constructed of a metal material and therefore an excellent heat conductor. Heat build-up on rotors is a problem that causes warping and deterioration of the rotor and the associated brake pads. Further, a brake pad which presses against a hot rotor will wear down quicker than a brake pad pressing against a cooler rotor. As a result, an exposed brake shoe under a worn brake pad may cause rough service to the rotor.

Another problem occurs from heat transfer through the calipers of the hydraulic brakes used on automobiles, such as racecourse, that typically must brake from high speeds. Braking from high speeds requires either pressing the brake pad harder against the rotor or pressing the brake pad against the rotor for a longer period of time than for slower speeds. Therefore, braking from high speeds typically generates more heat energy than braking from slower speeds generates. When braking from the high speeds which are typically experienced by racecourse, the additional heat energy may transfer also to the calipers and to the brake fluid. As a result, overheating and potential boiling of brake fluid, which may result in loss of braking ability, is an ongoing problem which typically occurs when braking from high speeds.

Numerous attempts have been made to correct for the foregoing problems. As is well-known in the art, constructing the rotor of multiple plates that are spaced by a plurality of heat-dissipating metal fins, as shown in FIGS. 1 and 2, addresses the problem of excessive heat build-up on brake rotors. Typically, as shown in FIG. 2, the heat-dissipating fins extend from an inner circumference to an outer circumference of at least two rotor plates. A free flow of air is thereby permitted between the plates and the fins. Therefore, heat energy, which is generated while braking, that transfers to the rotating rotor and to the heat-dissipating fins, ultimately transfers to the free flow of air passing between the plates and the fins. However, heat transfer to the air is not efficient enough in a variety of braking situations that generate excessive heat energy that causes warping and deterioration of the rotor and the brake pads.

Furthermore, U.S. Pat. No. 4,736,821, issued in the name of Res, discloses a fluid cooled brake having a pump that draws lubricating fluid from a sump and delivers the fluid to circulate and then be removed from within a closed annular chamber. U.S. Pat. No. 4,014,410, issued in the name of Bryant, discloses a disc brake with a fluid cooled actuator, wherein a fluid circuit includes a direct line leading to the master cylinder, a by-pass line leading to the master cylinder and a line leading from the cylinders of one side to the cylinders of the other side. However, these references require a fluid circuit through which fluid is exchanged within or about the brake rotor, rather than remaining within the rotor, thereby increasing the expense to manufacture the brake system.

Consequently, a need has been felt for providing a rotor which overcomes the problem of reducing heat build-up on the rotor of an automotive hydraulic brake system, wherein warping and deterioration of the rotor and associated brake pads is minimized, and wherein overheating and potential boiling of brake fluid is minimized when braking from high speeds, by transferring heat energy from the rotor with a fluid coolant medium which remains contained within the rotor.

SUMMARY OF THE INVENTION

It is therefore an object of the present invention to provide an improved rotor for an automotive hydraulic brake system.

It is an additional object of the present invention to reduce heat build-up on the rotor of an automotive hydraulic brake system.

It is a feature of the present invention to provide an improved rotor with an enclosed volume.

It is another feature of the present invention to provide a fluid coolant medium within the enclosed volume of the improved rotor.

It is another feature of the present invention to provide support fins within the enclosed volume of the rotor.

It is another feature of the present invention to provide a valve assembly in order that the fluid coolant medium may be injected into and removed from the enclosed volume of the rotor.

It is another feature of the present invention to provide a fluid coolant medium that becomes compressed under a centrifugal force experienced by the fluid coolant medium when the rotor rotates.

Briefly described according to one embodiment of the present invention, a compressed coolant hydraulic brake rotor is provided for reducing heat energy build-up, thereby minimizing warping and deterioration of the rotor and brake pads. The rotor provides an enclosed volume and a valve assembly used for insertion of a fluid coolant medium, such as freon, within the enclosed volume, which houses a plurality of interior surface support fins. The rotor is "enclosed" in order to contain and govern the fluid coolant medium. As the rotor is engaged and begins to rotate, centrifugal force pressurizes the coolant medium within the enclosed volume and causes the fluid coolant medium to compress. The fluid coolant medium rotates within the enclosed volume responsive to the rotation of the rotor, but at a lower angular velocity, thus continuous compression and decompression occurs as the relative motion between the fins and coolant is maintained. The coolant medium cools the rotor by heat energy transfer from the fins to the coolant medium, which gives up the heat to an outer wall, which in turn gives up the heat to the ambient air flowing thereby. The rotor may be used in any type of vehicle that functions with brakes.

In accordance with a preferred embodiment, a rotor is provided for an automotive hydraulic brake system, wherein the rotor is mounted to an axle of an automobile and has dual parallel disks which are perpendicular to the axle and supported by a plurality of heat-dissipating fins, and wherein the hydraulic brake system presses a brake pad against at least one of the disks, wherein the rotor comprises: a coolant medium; an enclosed volume between the dual parallel disks for receiving and housing the coolant medium; a plurality of heat-dissipating fins positioned within the enclosed volume to permit a flow of the coolant medium therebetween; coolant injection means for injecting the coolant medium under pressure into the enclosed volume, wherein the coolant medium flows around each of the plurality of heat-dissipating fins, thereby to fill the enclosed volume; and mounting means for mounting the rotor to the axle of the automobile.

An advantage of the present invention is that heat build-up on the rotor is reduced, thereby extending rotor life and associated brake pad life by minimizing warping and deterioration of the rotor and brake pads.

Another advantage of the present invention is that the fluid coolant medium may be easily injected into and removed from the enclosed volume of the rotor.

Another advantage of the present invention is compatibility with all disk brake systems.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
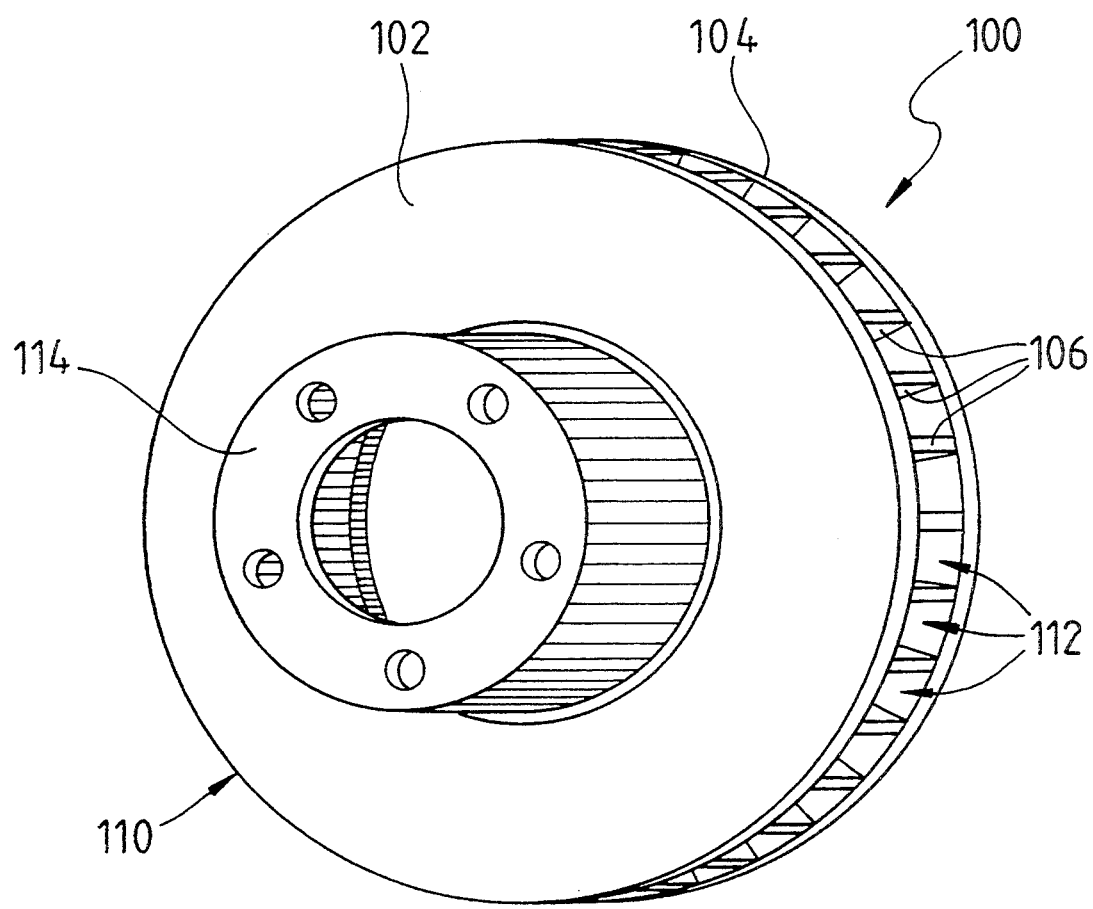
FIG. 1 is a front and side perspective view of a hydraulic brake rotor showing heat-dissipating fins along an outer circumference, according to the prior art.
Figure 2:
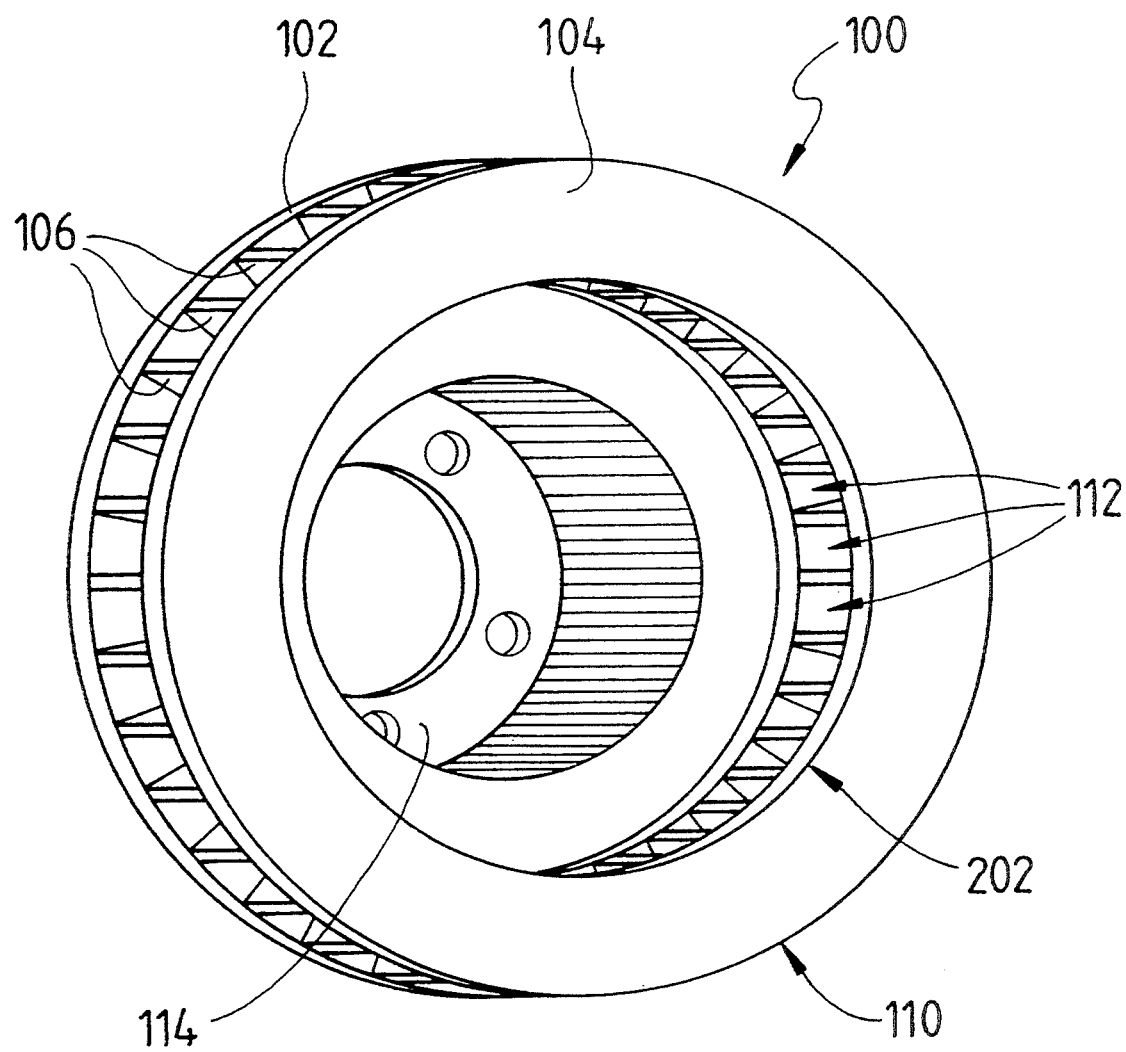
FIG. 2 is a rear and side perspective view of the hydraulic brake rotor of FIG. 1, wherein the heat-dissipating fins are shown extending from the inner circumference to an outer circumference.

An illustrative rotor 100 is shown in FIGS. 1 and 2, according to the prior art, having a first plate 102 which is connected in spaced-relationship to a second plate 104 by a plurality of heat-dissipating metal fins 106, which typically extend from an inner circumference 202 (see FIG. 2) to an outer circumference 110 of the first plate 102 and the second plate 104. FIG. 1 is a front and side perspective view of the rotor 100 of the prior art; and FIG. 2 is a rear and side perspective view of the rotor 100. The plurality of heat-dissipating metal fins 106 provide a plurality of open-ended channels 112 through which air may flow between the first plate 102 and the second plate 104. Therefore, heat energy from the first plate, the second plate, and the fins may be transferred to the air flowing between the first plate 102 and the second plate 104, particularly when the rotor 100 is rotating in operation. The first plate 102 and the second plate 104 are attached to a hub housing 114 for mounting the rotor 100 to an axle (not shown) of an automobile (not shown) in a manner well-known in the art.

Figure 3:
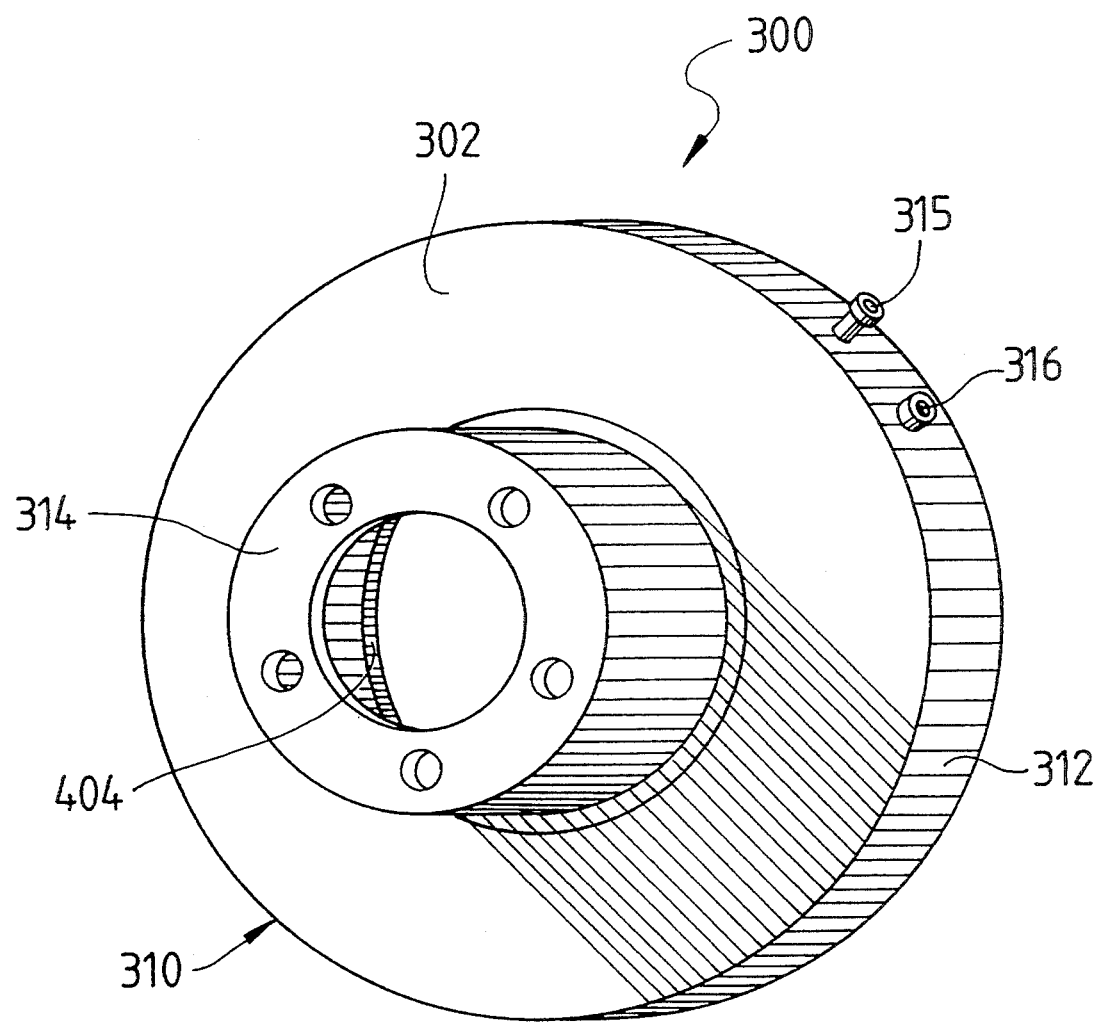
FIG. 3 is a front and side perspective view of a compressed coolant hydraulic brake rotor, according to a preferred embodiment of the present invention.
Figure 4:
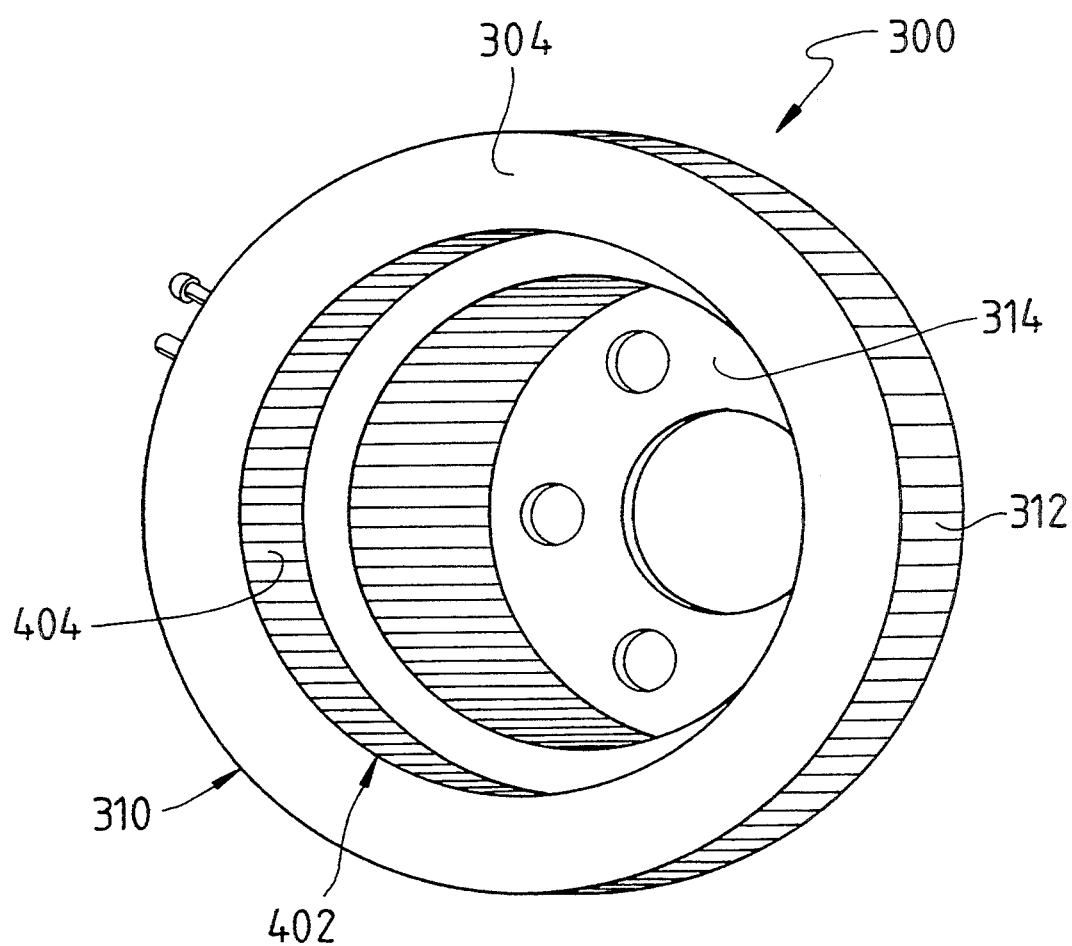
FIG. 4 is a rear and side perspective view of the compressed coolant hydraulic brake rotor of FIG. 3.
Figure 5:
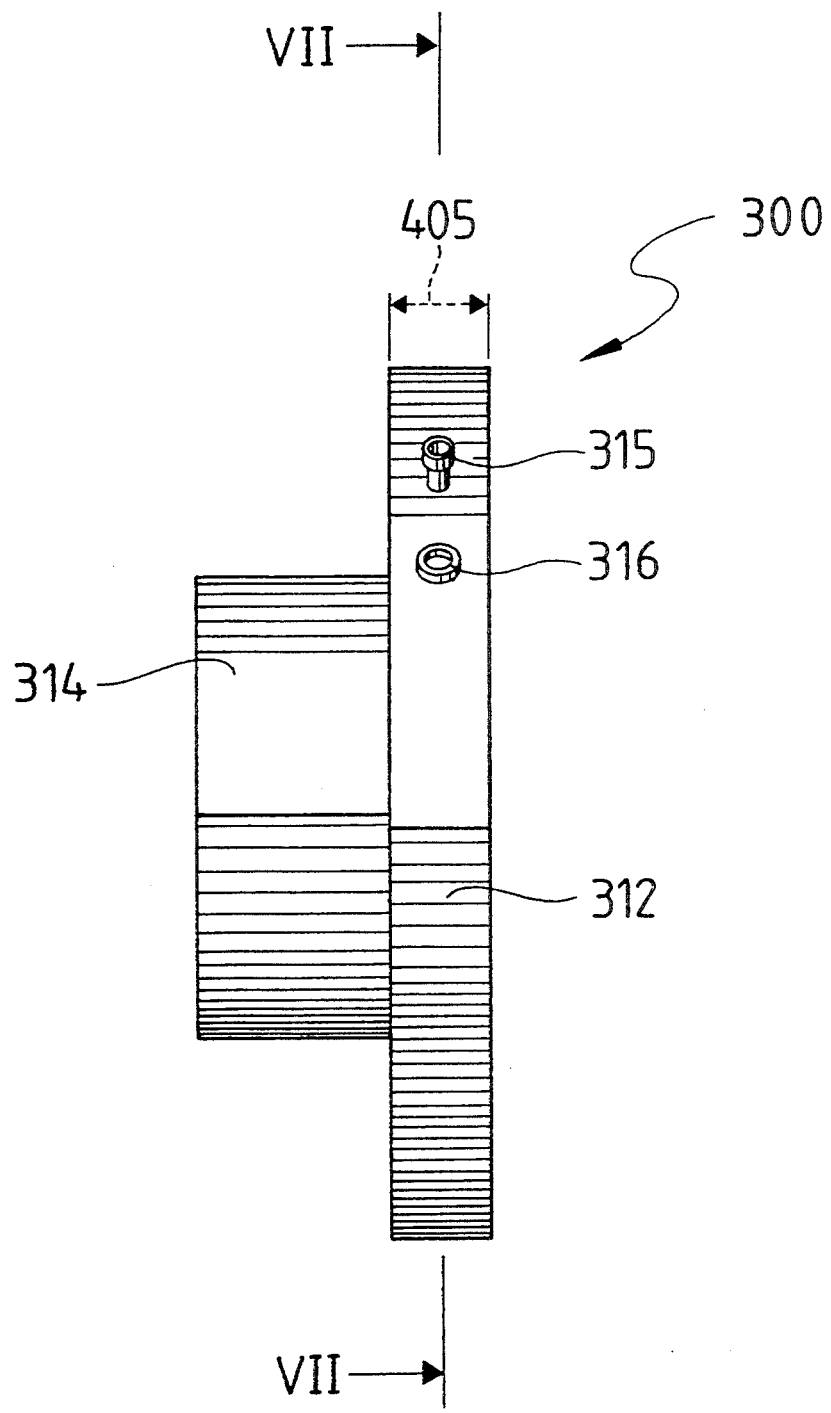
FIG. 5 is a side elevational view of the compressed coolant hydraulic brake rotor of FIG. 3.

By contrast, FIGS. 3, 4 and 5 show a rotor 300 according to a preferred embodiment of the present invention. FIG. 3 is a front and side perspective view of the rotor 300; FIG. 4 is a rear and side perspective view of the rotor 300; and FIG. 5 is a side elevational view of the rotor 300. Similarly to the rotor 100, the rotor 300 has a first plate 302 and a second plate 304, both with an inner circumference 402 and an outer circumference 310, and both of which are attached to a hub housing 314 for mounting the rotor 300 to an axle (not shown) of an automobile (not shown) in a manner well-known in the art. However, the first plate 302 is connected in spaced-relationship to the second plate 304 by an inner wall 404 having a width 405 (see FIG. 5) with a preferred range of 0.125 inches to 1.5 inches, which is attached along the inner circumference 402, and an outer wall 312 having the width 405, which is attached along the outer circumference 310, thereby to define an enclosed and sealed volume 601 (see FIG. 6) within the first plate 302 and the second plate 304.

A first valve assembly 315 provides an openable and closable inlet through which a thermally transmissive gas or a thermally transmissive fluid, such as air or a fluid coolant medium, such as freon for example, may be introduced into the otherwise enclosed and sealed volume 601. A second valve assembly 316 provides an openable and closable outlet through which a gas or a fluid, such as air or a fluid coolant medium, such as freon, may be removed from the otherwise enclosed and sealed volume 601. A preferred embodiment of the present invention includes a plurality of counterweights (not shown) that are positioned on the outer wall 312 to balance the rotation of the rotor 300 against the weight of the first valve assembly 315 and the second valve assembly 316.

Figure 6:
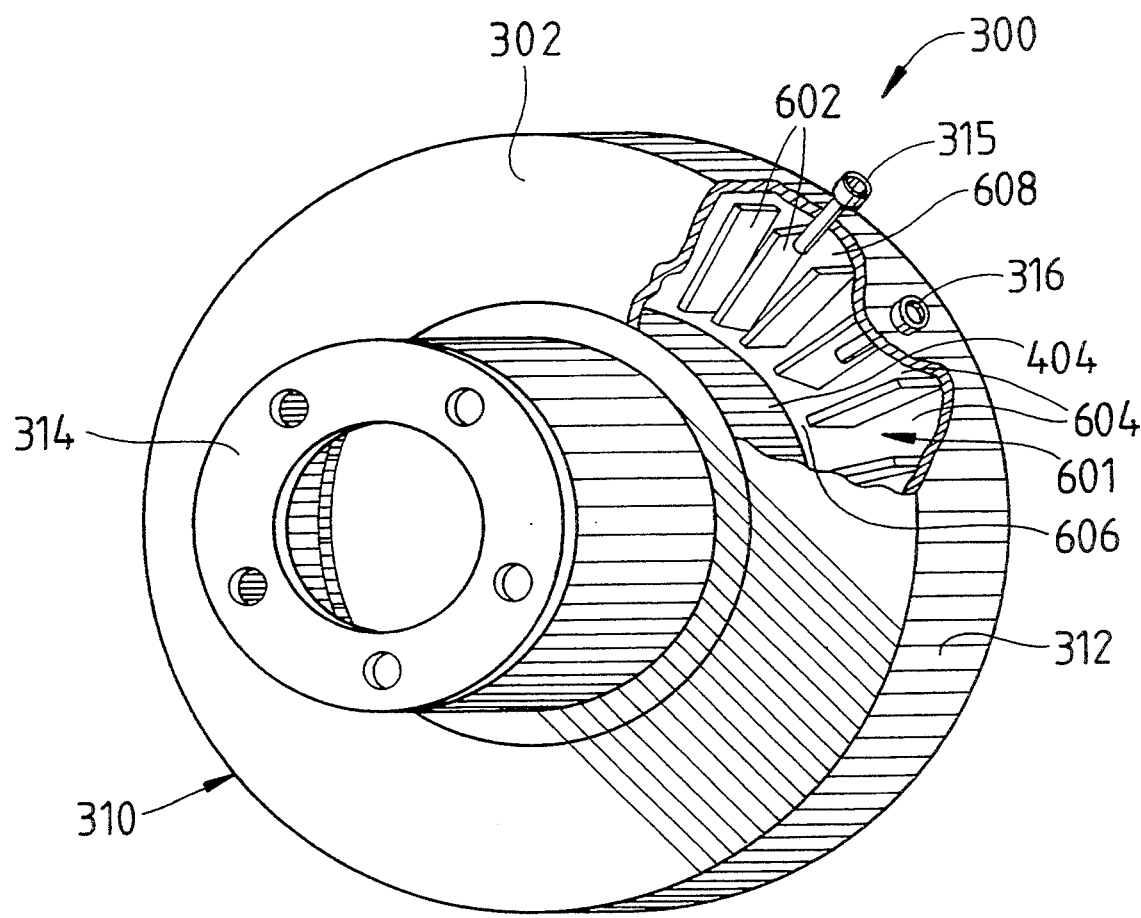
FIG. 6 is a partial cross-sectional view of the rotor of FIG. 3, wherein heat-dissipating fins housed within the rotor are shown according to a preferred embodiment of the present invention.

FIG. 6 shows a partial cross-sectional view of the rotor of FIG. 3, wherein a plurality of short supporting fins 602 are partially shown within the enclosed and sealed volume 601. The short supporting fins 602 approximate the width 405 and attach centrally to the first plate 302 and the second plate 304, in order to partially extend toward the inner wall 404 and toward the outer wall 312, thereby to separate the enclosed and sealed volume 601 into a plurality of open segments 604 that are each interconnected by an inner open channel 606 along the inner wall 404 and an outer open channel 608 along the outer wall 312.

Figure 7:
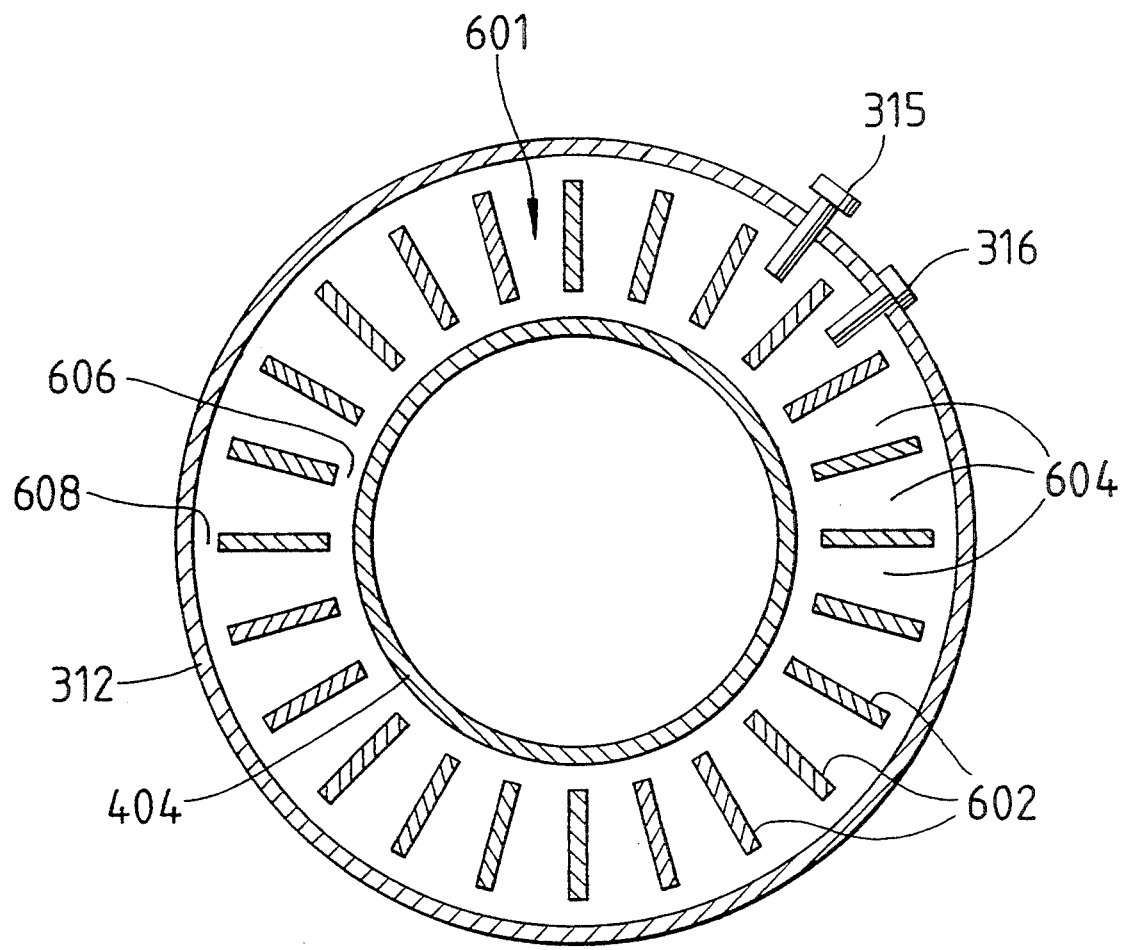
FIG. 7 is a cross-sectional view of the present invention taken along the lines VII—VII of FIG. 5.

FIG. 7 is a cross-sectional view of the rotor 300 taken along the lines VII—VII to better illustrate in cross-section the inter-relationships of the inner wall 404, the outer wall 312, the plurality of short supporting fins 602, the plurality of open segments 604, the inner open channel 606, the outer open channel 608, the first valve assembly 315, the second valve assembly 316, and the enclosed and sealed volume 601. One skilled in the art will recognize that the plurality of short supporting fins 602 may be positioned in a variety of positions within the enclosed and sealed volume 601 in order to achieve the support and heat-dissipating characteristics of the present invention.

Figure 8:
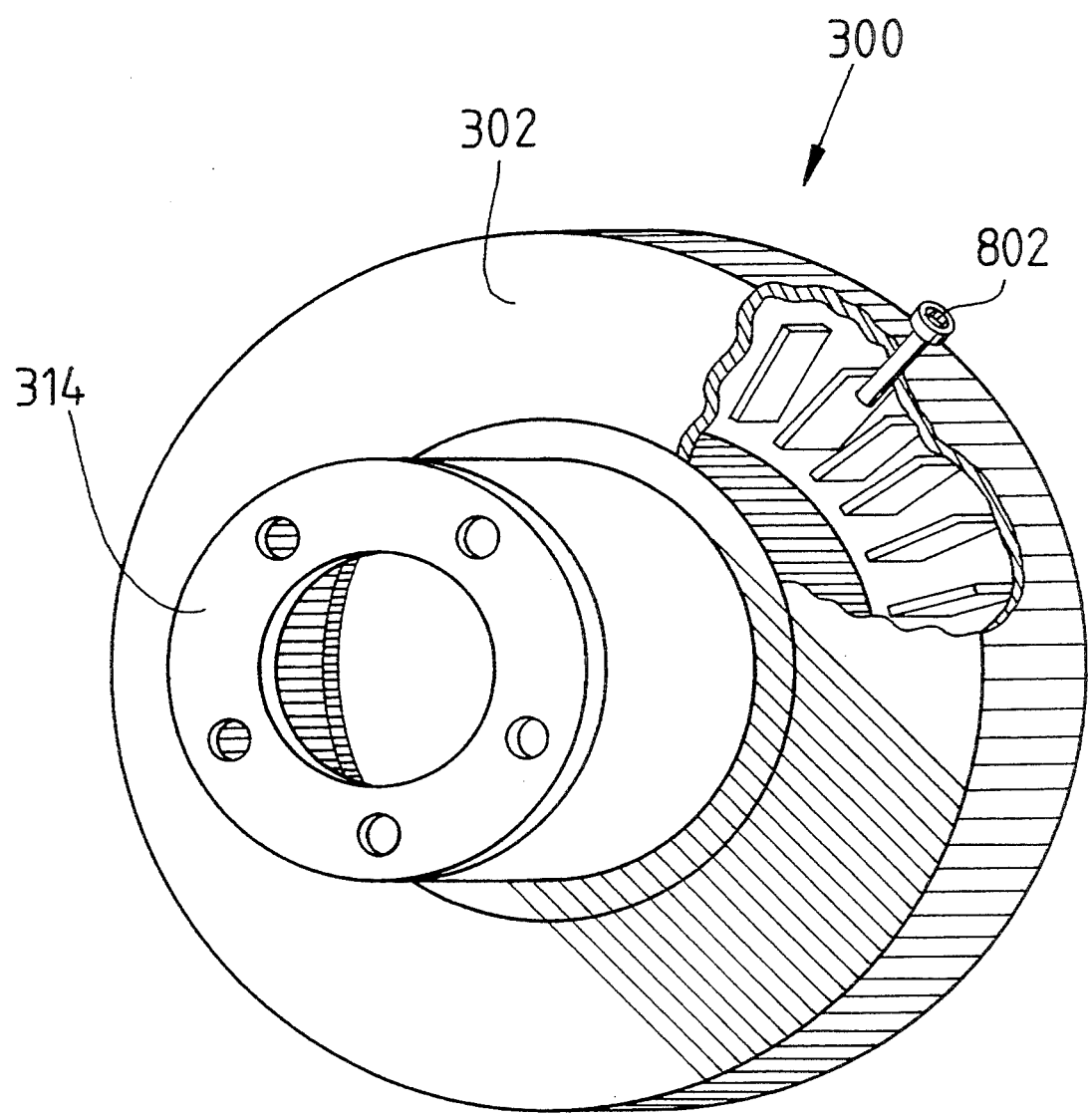
FIG. 8 is a front and side perspective view of a compressed coolant hydraulic brake rotor with a single valve, according to another preferred embodiment of the present invention.

FIG. 8 is a front and side perspective view of the rotor 300 with a single valve assembly 802, according to another preferred embodiment of the present invention. According to this preferred embodiment, the single valve assembly 802 functions as an inlet valve as well as an outlet valve with an open and closed position.

2. Operation of the Preferred Embodiment

In accordance with the preferred embodiment of the present invention shown in FIG. 3, the first valve assembly 315 and the second valve assembly 316 is opened order that a fluid coolant medium (not shown), such as freon or other coolant medium well-known in art, may be injected under a pressure force, preferably 1.5 pounds per square inch, into the enclosed and sealed volume 601, thereby to displace the gas or fluid within the enclosed and sealed volume 601. The displaced gas or fluid is forced out of the second valve assembly 316, until the fluid coolant medium bleeds out of the second valve assembly 316, thereby indicating that the enclosed and sealed volume 601 is filled with the fluid coolant medium. The first valve assembly 315 and the second valve assembly 316 are then closed, thereby to retain the fluid coolant medium within the enclosed and sealed volume 601.

The hub housing 314 is subsequently attached to the axle (not shown) of an automobile (not shown) in a manner well-known in the art, thereby to position the rotor 300 to rotate consistent with the rotational axis of the axle. Rotation of the rotor causes a centrifugal force which acts on the fluid coolant medium in a direction away from the rotational axis, thereby compressing the fluid coolant medium against the outer wall 312. Because the fluid is not rigidly affixed to the rotor, it will behave as a fluid and will not rotate at the same speed as the rotor. As the fluid and the rotor undergo relative motion, the fluid will lag behind the rotor. As the fluid lags, it will pass through the spaces between the outer wall 312 and the plurality of short supporting fins 602, thereby being subjected to alternating periods of compression and expansion, such that a continuous heat exchange modulation is set up. Accordingly, the coolant will absorb and give up heat from the adjacent surfaces as it expands and contracts, thereby reducing the heat build-up on the rotor 300 that otherwise causes warping and deterioration of the rotor and associated brake pads.

In accordance with the preferred embodiment shown in FIG. 8, the single valve assembly 802 functions as an inlet valve as well as an outlet valve. In operation, an extraction device (not shown), such as a vacuum hose (not shown), is attached to the single valve assembly 802 in order to remove any air or fluid within the enclosed and sealed volume 601 by lowering the pressure within the enclosed and sealed volume 601 relative to an ambient pressure, thereby creating a vacuum within the enclosed and sealed volume 601. The single valve assembly 802 subsequently is closed in order to maintain the vacuum until the single valve assembly 802 is opened after coolant injection means, such as a coolant fluid hose (not shown) is attached to the single valve assembly 802. The fluid coolant medium is injected under pressure into the enclosed and sealed volume 601 and the single valve assembly 802 subsequently is closed to retain the pressurized fluid coolant medium within the enclosed and sealed volume 601.

A preferred embodiment of the present invention may be molded from the prior art illustrative rotor 100. As is well known in the brake rotor art, the illustrative rotor 100 of the prior art typically has a diameter of 12 inches for the first plate 102 and the second plate 104. Calipers, which are well-known in the brake rotor art and which press the brake pads against the first plate 102 and the second plate 104, typically have a clearance tolerance of 0.125 inches with the outside circumference 310 of the rotor 100. Therefore, the rotor 100 must be particularly machined to maintain this clearance tolerance.

As mentioned, in the prior art, the heat-dissipating metal fins 106 typically extend from the inner circumference 202 to the outer circumference 110. A lathe (not shown) is utilized to machine each end of the fins 106 down approximately 0.375 inches into the rotor. Further, the lathe is utilized to machine a groove along the outer circumference 110 at the inner surface along both the inner circumference 202 and the outer circumference 110 of each of the first plate 102 and the second plate 104 onto which the fins 106 attach, thereby to define a grooved area (not shown) which receives a first strip of metal (not shown), such as steel. The first strip of metal is welded into a fixed position within the rotor 100, thereby to define the outer wall 312. The first strip of metal for the outer wall 312 preferably has a thickness approximating 0.25 inches, a width approximating the width 405, and a length approximating the outer circumference 310. When the first strip of metal is welded into position, the first strip of metal remains out of contact with the fins 106 which have been machined down by 0.375 inches, thereby defining the outer open channel 608, which approximates 0.125 inches in width, located between the fins 106 and the first strip of metal that defines the outer wall 312.

Additionally, the lathe is utilized to machine a groove along the inner circumference 202 at the inner surface of the first plate 102 and the second plate 104 onto which the fins 106 attach, thereby to define a grooved area (not shown) which receives a second strip of metal (not shown), such as steel. The second strip of metal is welded into a fixed position within the rotor 100, thereby to define the inner wall 404. The second strip of metal for the inner wall 404 preferably has a thickness approximating 0.25 inches, a width approximating the width 405, and a length approximating the inner circumference 202. When the second strip of metal is welded into position, the second strip of metal remains out of contact with the fins 106, which have been machined down by 0.375 inches, thereby defining the inner open channel 606, which approximates 0.125 inches in width, located between the fins 106 and the second strip of metal that defines the inner wall 404. Finally, a hole (not shown) approximating 0.375 inches in diameter is drilled into the outer wall 312, thereby to receive a filler plug (not shown), such as is commonly known in the air conditioner art, which has a valve core known in the art with an open position and a closed position.

In another preferred embodiment of the present invention which may be molded from the prior art illustrative rotor 100, the lathe (not shown) is utilized to machine the second plate 104 along both the inner circumference 202 and the outer circumference 110, as well as each end of the fins 106 down approximately 0.375 inches into the rotor. Further, the lathe is utilized to machine a groove along the outer circumference 202 of the first plate 102, thereby to define an outer grooved area (not shown) along the outer circumference 110 of the first plate 102. The outer grooved area receives an outer copper gasket which has thickness approximating 0.0625 inches, a width approximating 0.125, and a circumference approximating the outer circumference 110. The outer grooved area then receives an outer metal ring (not shown), which is cushioned by the outer copper gasket against the first plate 102, and which cooperates with the first plate 102 and the second plate 104. The outer metal ring is welded into a fixed position against the first plate 102 and the second plate 104, within the rotor 100, thereby to define the outer wall 312. The outer metal ring for the outer wall 312 preferably has a thickness approximating 0.25 inches, a width approximating the width 405, and a circumference approximating the outer circumference 310. When the outer metal ring is welded into position, the outer metal ring remains out of contact with the fins 106 which have been machined down by 0.375 inches, thereby defining the outer open channel 608, which approximates 0.125 inches in width, located between the fins 106 and the outer metal ring that defines the outer wall 312.

Additionally, the lathe is utilized to machine a groove along the inner circumference 202 of the first plate 102, thereby to define an inner grooved area (not shown) along the inner circumference 202 of the first plate 102. The inner grooved area receives an inner copper gasket which has thickness approximating 0.0625 inches, a width approximating 0.125, and a circumference approximating the inner circumference 202. The inner grooved area then receives an inner metal ring (not shown), which is cushioned by the inner copper gasket against the first plate 102, and which cooperates with the first plate 102 and the second plate 104. The inner metal ring is welded into a fixed position against the first plate 102 and the second plate 104, within the rotor 100, thereby to define the inner wall 404. The inner metal ring for the inner wall 404 preferably has a thickness approximating 0.25 inches, a width approximating the width 405, and a circumference approximating the inner circumference 310. When the inner metal ring is welded into position, the inner metal ring remains out of contact with the fins 106 which have been machined down by 0.375 inches, thereby defining the inner open channel 608, which approximates 0.125 inches in width, located between the fins 106 and the inner metal ring that defines the inner wall 312. Finally, a hole (not shown) approximating 0.375 inches in diameter is drilled into the outer wall 312, thereby to receive a filler plug as described above.

The foregoing description of the preferred embodiment of the present invention has been presented for purposes of illustration and description. It is not intended to be exhaustive or to limit the present invention to the precise form disclosed, and obviously many modifications and variations are possible in light of the above teachings.

The preferred embodiment was chosen and described in order to best explain the principles of the present invention and its practical application to those persons skilled in the art, and thereby to enable those persons skilled in the art to best utilize the present invention in various embodiments and with various modifications as are suited to the particular use contemplated. It is intended that the scope of the present invention be broadly defined by the claims which follow.

What is claimed is:

1. A rotor for an automotive hydraulic brake system which presses a brake pad against a rotating surface mounted to an axle of an automobile, wherein the rotor comprises:

a first and a second circular flat plate having an inner circumference and an outer circumference, wherein a plate width is defined therebetween;

a plurality of supporting fins having a fin length smaller than said plate width and a fin width, wherein said fins connect said first and second circular flat plates in a spaced cylindrical relationship defined by said fin width, and wherein said fins are fixedly attached between said first and second circular flat plates in order to define a plurality of fin channels therebetween said plurality of supporting fins, an inner circumference channel along said inner circumference, and an outer circumference channel along said outer circumference, whereby said plurality of fin channels is interconnected with said inner circumference channel and said outer circumference channel, thereby to define a plurality of continuous pathways between said inner circumference and said outer circumference of said first and second circular flat plates;

an inner wall approximating said fin width attached along said inner circumference of said first and second circular flat plates;

an outer wall approximating said fin width attached along said outer circumference of said first and second circular flat plates, wherein said outer wall and said inner wall define an enclosed volume within said first and second circular flat plates;

a coolant medium;

coolant injection means mounted on said rotor for injecting said coolant medium under pressure into said enclosed volume, wherein said coolant medium flows around each of said plurality of supporting fins throughout said plurality of continuous pathways, thereby to fill said enclosed volume, mounting means for mounting said rotor to the axle of the automobile, wherein said mounting means is attached to said inner wall along said inner circumference, and wherein said coolant injection means is a valve having an open position and a closed position, wherein said open position permits injection of said coolant medium therethrough and into said enclosed volume, and wherein said closed position seals said coolant medium inserted under pressure into said enclosed volume against removal therefrom.

2. The rotor according to claim 1, wherein said coolant medium comprises a fluid substance.

3. The rotor according to claim 2, wherein said fluid substance is freon.

4. The rotor according to claim 1, wherein said fin width ranges from 0.125 inches to 1.5 inches.

5. The rotor according to claim 1, wherein said coolant medium is injected into said enclosed volume at a pressure approximating 1.5 pounds per square inch.

6. A rotor for an automotive brake system wherein a brake pad is pressed against a rotating surface mounted to an axle of an automobile, wherein the rotor comprises:

(a) a first and second circular discs mounted for rotation to an axle of an automobile and spaced apart a predetermined distance, said discs defining an outer surface against which a brake pad may be urged;

(b) an inner wall and an outer wall affixed between said first and second circular discs to define an enclosed internal volume therebetween;

(c) a quantity of coolant fluid sufficient to fill said volume;

(d) valve means for permitting selective ingress and egress of said coolant fluid within said enclosed volume said valve means having an open position and a closed position, wherein said open position permits injection of said coolant fluid therethrough and into said enclosed volume, and wherein said closed position seals said coolant fluid inserted under pressure into said enclosed volume against removal therefrom during rotation; and (e) means affixed to said first and second discs for inducing compression and decompression of said coolant fluid within said enclosed volume responsive to rotation of said rotor.

7. A rotor as in claim 6, wherein said means for inducing compression comprises a plurality of fins interconnected between said first and second discs, defining a plurality of radial segments in fluid communication with an inner and outer annular open volume between said fins and said inner and outer walls, respectively.

8. A rotor as defined in claim 7, wherein said fins and said outer wall are made from a thermally transmissive material.

9. The rotor according to claim 6, wherein said coolant fluid is injected into said enclosed volume at a pressure approximating 1.5 pounds per square inch.

10. A rotor for an automotive hydraulic brake system, wherein the rotor is mounted to an axle of an automobile and has dual parallel disks which are perpendicular to the axle and supported by a plurality of heat-dissipating fins, and wherein the hydraulic brake system presses a brake pad against at least one of the disks, wherein the rotor comprises:

a coolant medium;

an enclosed volume between said dual parallel disks for receiving and housing said coolant medium;

said plurality of heat-dissipating fins positioned within said enclosed volume to permit a flow of said coolant medium therebetween;

coolant injection means mounted on said rotor for injecting said coolant medium under pressure into said enclosed volume, wherein said coolant medium flows around each of said plurality of heat-dissipating fins, thereby to fill said enclosed volume, mounting means for mounting the rotor to the axle of the automobile, and wherein said coolant injection means is a valve having an open position and a closed position, wherein said open position permits injection of said coolant medium therethrough and into said enclosed volume, and wherein said closed position seals said coolant medium inserted under pressure into said enclosed volume against removal therefrom.

11. The rotor according to claim 10, wherein said coolant medium comprises a fluid substance.

12. The rotor according to claim 11, wherein said fluid substance is freon.

13. The rotor according to claim 10, wherein said coolant medium is injected into said enclosed volume at a pressure approximating 1.5 pounds per square inch.

* * * * *